(12) United States Patent
Huang

(10) Patent No.: US 7,725,705 B2
(45) Date of Patent: May 25, 2010

(54) BIOS SETTING METHOD

(75) Inventor: Kun-Hung Huang, Taipei (TW)

(73) Assignee: Inventec Corporation, Taipei (TW)

( * ) Notice: Subject to any disclaimer, the term of this patent is extended or adjusted under 35 U.S.C. 154(b) by 684 days.

(21) Appl. No.: 11/672,228

(22) Filed: Feb. 7, 2007

(65) Prior Publication Data

US 2008/0189541 A1 Aug. 7, 2008

(51) Int. Cl.
*G06F 15/177* (2006.01)

(52) U.S. Cl. ............................. 713/2; 713/1; 713/100

(58) Field of Classification Search ................ 713/1, 713/2, 100
See application file for complete search history.

(56) References Cited

U.S. PATENT DOCUMENTS 6,721,883 B1 * 4/2004 Khatri et al. .................. 713/2

2003/0028765 A1 * 2/2003 Cromer et al. ............... 713/164
2004/0111597 A1 * 6/2004 Rothman et al. ............... 713/1

* cited by examiner

*Primary Examiner*—Tse Chen

(57) ABSTRACT

A basic input output system (BIOS) setting method is applicable to a BIOS setting procedure of a data processing unit having a display unit and an input unit. After the data processing unit is turned on and a power on self test (POST) procedure of the BIOS is being executed, messages of a first function key and a second function key are displayed on the display unit. If the first function key is pressed, a first BIOS setting mode is entered. After the first BIOS setting mode is entered, whether any setting contents of the first BIOS setting mode are revised and saved in the data processing unit is determined, and the corresponding POST is executed based on the revised setting contents of the first BIOS setting mode, or the first BIOS setting mode is skipped and the continuing POST procedure continues to be executed.

6 Claims, 3 Drawing Sheets

BIOS SETTING METHOD

BACKGROUND OF THE INVENTION

1. Field of the Invention

This invention generally relates to data processing techniques, and more specifically, to a basic input output system (BIOS) setting method.

2. Description of Related Art

A basic input output system (BIOS) is an embedded software and is stored in the form of a firmware in varieties of hardware and systems, such as information, telecommunication, consumer electronic products. The BIOS is in charge of driving, control management, and interfacing between human and machine, and can be applied to programs. BIOS is a software, but it is capable of adding functions and value to hardware thus saving production cost by making a hardware capable of software functions, compared with an operating system or an applied software, it has closer relationship with hardware and is in charge of the setting of central processing unit, memory, and boot order, etc. and it is the key that determines if the hardware functions can be brought into full performances. In addition, BIOS provides the most reliable security protection mechanism to prevent any unauthorized users from accessing computers.

When a computer is turned on, BIOS is executed by the flash memory of the circuit board, and the subsystems of chip sets and memory are sequentially displaying on and disappearing from the display unit, and then the BIOS itself decompresses from the flash memory to the system main memory and begins to execute therefrom. The BIOS codes of PC also has diagnostic functions in order to ensure some important hardware elements, such as keyboard, disk device, and input/output ports etc. can function and be initialized normally. Almost all of the BIOSs are capable of selectively executing the preset programs of a complementary metal oxide semiconductor (CMOS) memory; in other words, the BIOS is capable of saving users' preset information of time, date, and hard disc's details, etc.

In the BIOS implementations of nowadays, after getting into a BIOS setting mode, user is allowed to selectively set fan speed, control energy saving, set over clocking, and decide which device to be turned on first, devices such as video disc player, hard disk, floppy disk, flash, and others, this function provides special advantage for installing operating system. However, in the aforementioned BIOSs, after the boot order or any other related configurations have been set, the system will restart no matter the aforementioned BIOS setting is saved or not, all the related boot procedure, such as the power on self test and the initiation option ROM execution will reprocess again, and then proceed to the operating system for loading operations. As a matter of fact, for some of the setting contents, even after they have been revised and skipping out of the BIOS setting mode, the POST procedure can be continued without the need of restarting computer. However, in the BIOS setting mechanism of prior art, after revise and save any BIOS setting contents, the data processing unit must restart as soon as it skips the BIOS setting mode, for any revised BIOS setting that do not effect the continuing POST procedure, apparently it wastes time to go over the boot order again.

In view of the above, it is a highly urgent issue in the industry for how to provide a basic input output system setting method, which can effectively solve the drawback that it has to restart the data processing unit for any revised BIOS setting contents and thus wastes time in the boot order as in the prior art.

SUMMARY OF THE INVENTION

In view of the disadvantages of the prior art mentioned above, it is a primary objective of the present invention to provide a basic input output system setting method, which is capable of distinguishing the BIOS setting mode whose revised setting does not affect the continuing POST procedure from the BIOS setting mode whose revised setting requires to restart the data processing unit, therefore, users do not have to restart computer after revising in the BIOS setting mode wherein the revised setting does not affect the continuing POST procedure, thus the basic input output system setting method of the present invention is capable of enhancing the efficiency of the turn on procedure.

To achieve the aforementioned and other objectives, a basic input output system setting method is provided according to the present invention. The basic input output system setting method is applicable to a BIOS setting procedure of a data processing unit having a display unit and an input unit. The BIOS setting method includes the following steps of: (1) after the data processing unit is turned on and while a power on self test (POST) procedure of the BIOS is being executed, displaying messages of a first function key and a second function key on the display unit, the first function key being for entering a first BIOS setting mode, the second function key being for entering a second BIOS setting mode; (2) determining whether the first function key or the second function key is pressed via the input unit, and proceeding to step (3) if the first function key is pressed, to step (4) if the second function key is pressed, or continuing executing the POST if none of the first function key and the second function key is pressed; (3) entering the first BIOS setting mode from the POST procedure, and determining whether any setting contents of the first BIOS setting mode are revised and saved in the data processing unit and proceeding to step (5) if some of the setting contents of the first BIOS setting mode are revised and saved in the data processing unit or skipping the first BIOS setting mode and continuing executing the POST procedure if none of the setting contents of the first BIOS setting mode are revised or saved in the data processing unit; (4) entering the second BIOS setting mode from the POST procedure, and determining whether any setting contents of the second BIOS setting mode are revised and saved in the data processing unit and proceeding to step (6) if none of the setting contents of the second BIOS setting mode are revised or saved in the data processing unit or skipping the second BIOS setting mode and continuing executing the POST procedure if some of the setting contents of the second BIOS setting mode are revised and saved in the data processing unit; (5) continuing executing the corresponding POST procedure based on the revised setting contents of the first BIOS setting mode; and (6) commanding the data processing unit to restart, and returning to step (1).

Compared with the BIOS setting technique of the prior art, the present invention provides a basic input output system setting method, which is capable of, by means of the aforementioned setting and execution flowchart, distinguishing the BIOS setting mode whose revised setting will not affect the continuing POST procedure from the BIOS setting mode whose revised setting requires the data processing unit to restart, therefore, users do not have to restart computer after revising in the BIOS setting mode that does not affect the continuing POST procedure, thus the basic input output system setting method of the present invention enhances the efficiency of the turn on procedure.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

First Embodiment

Figure 1:
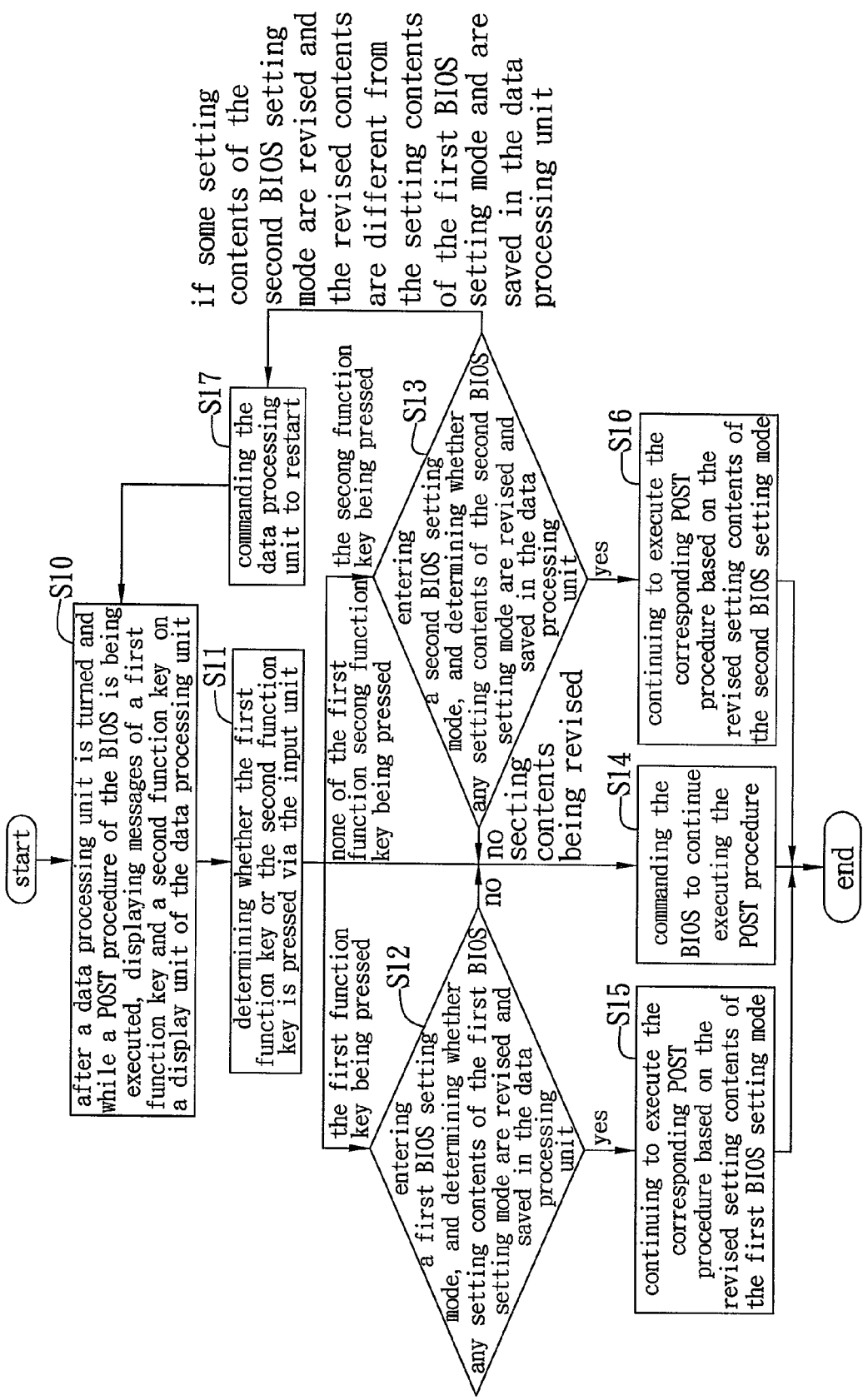
FIG. 1 is a flow chart of a basic input output system (BIOS) setting method of a first embodiment according to the present invention.

Please refer to FIG. 1, which is a flow chart of a basic input output system (BIOS) setting method of a first embodiment according to the present invention. The BIOS setting method is applicable to a BIOS setting procedure of a data processing unit having a display unit and an input unit. Specifically, the data processing unit can be, but is not restricted to, a personal computer, a notebook computer, a server, a workstation or other BIOS-related devices. The data processing unit executes the POST procedure via the BIOS. The display unit is connected to the data processing unit, for displaying characters, signs and/or images output by the data processing unit. The display unit can be for example a liquid crystal display. The input unit is also connected to the data processing unit, for inputting commands, characters and/or sign to the data processing unit. The input unit is for example a keyboard.

As shown in FIG. 1, the method starts in step S10. In step S10, after the data processing unit is turned on and while the BIOS POST procedure is being executed, messages of a first function key and a second function key are displayed on the display unit. The first function key is for entering a first BIOS setting mode, while the second function key is for entering a second BIOS setting mode. The method proceeds to step S11. According to the first embodiment, the BIOS includes at least an option ROM program, and further includes at least a boot order program and/or an option ROM controller program before the option ROM program is executed. The setting contents of the first BIOS setting mode comprise the settings of the boot order program and/or the option ROM controller program, and the setting contents of the second BIOS setting mode comprise the setting contents of the first BIOS setting mode, and other common setting contents of BIOS, such as sound card setting and/or memory setting. It should be noted herein, as in another embodiment of the present invention, the setting contents of the second BIOS setting mode do not necessarily include the setting contents of the first BIOS setting mode, in other words, the setting contents of the first BIOS setting mode are different from the setting contents of the second BIOS setting mode, and users enter the first BIOS setting mode or the second setting mode based on the needs of the situation.

According to the first embodiment, the first function key is, for example, F7, and the second function key is, for example, F10. The foregoing setting of function keys can be revised based on the practical situation, the function keys can be other keys or combinations of keys.

In step S11, whether the first function key or the second function key is pressed via the input unit is determined. If the first function key is pressed, the method proceeds to step S12; if the second function key is pressed, the method proceeds to step S13; if none the first function key and the second function key is pressed, the method proceeds to step S14. According to the first embodiment, to enter the first BIOS setting mode, the first function key must be pressed before the option ROM program is executed, because that all the revised setting contents can be normally operated only after the data processing unit has restarted if the revises are made at the time that the POST procedure is at the step of executing the option ROM program or any programs following the option ROM program.

In step S12, the first BIOS setting mode is entered from the POST procedure, and whether any setting contents of the first BIOS setting mode are revised and saved in the data processing unit is determined. If yes, the method proceeds to step S15; otherwise, the method proceeds to step S14.

In step S13, the second BIOS setting mode is entered from the POST procedure, and whether any setting contents of the second BIOS setting mode are revised and whether the revised contents are the same as the setting contents of the first BIOS setting mode and are saved in the data processing unit are determined. If some of the setting contents of the second BIOS setting mode are revised and the revised setting contents are the same as the setting contents of the first BIOS setting mode and are saved in the data processing unit, the method proceeds to step S16; if some of the setting contents of the second BIOS setting mode are revised but the revised setting contents are different from the content of the second BIOS setting mode and are saved in the data processing unit, the method proceeds to step S17; if none of the setting contents of the second BIOS setting mode is revised, the method proceeds to step S14.

In step S14, the BIOS is commanded to continue executing the POST procedure.

In step S15, the corresponding POST procedure continues to be executed based on the revised setting contents of the first BIOS setting mode.

In step S16, the corresponding POST procedure continues to be executed based on the revised setting contents of the second BIOS setting mode.

In step S17, the data processing unit is commanded to restart, and the method returns to step S11.

Figure 2A:
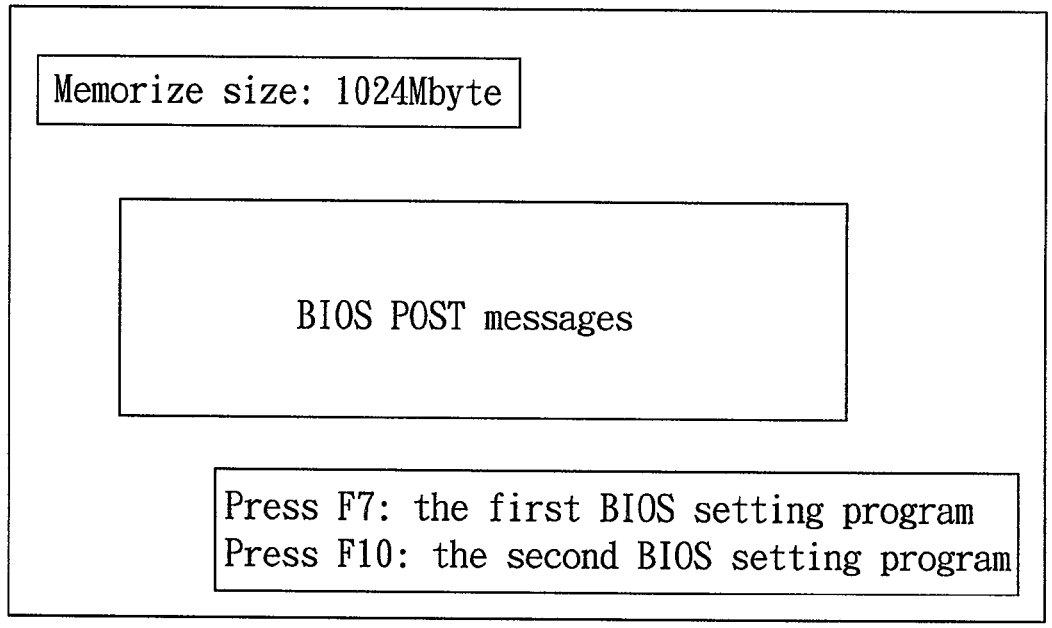
FIGS. 2a and 2b show messages on a display unit of a data processing unit while the basic input output system setting method of the present invention is executed.
Figure 2B:
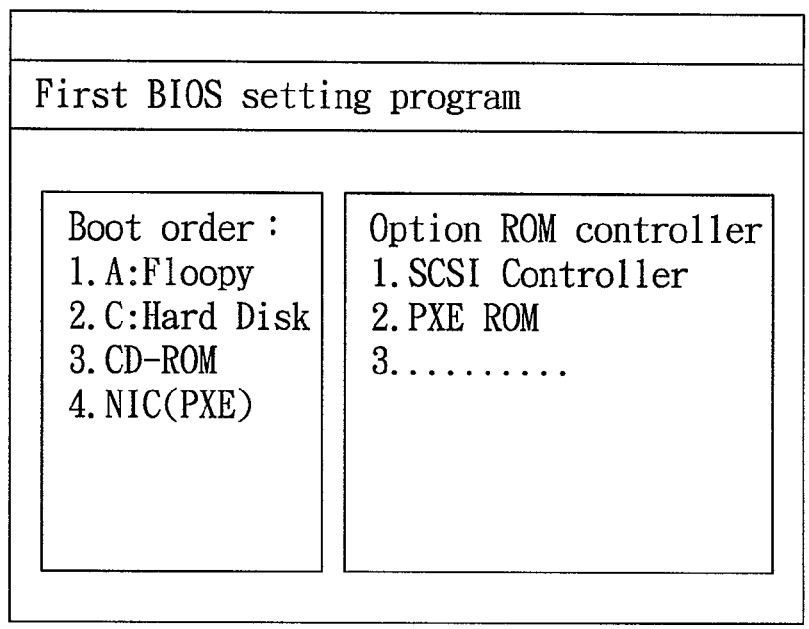

Please refer to FIGS. 2a and 2b, which show messages on the display unit of the data processing unit while the basic input output system setting method of the present invention is executed. As shown in FIG. 2a and in step S10, after the data processing unit is turned on and the POST procedure of the BIOS is being executed, the messages of the first function key and the second function key are displayed on the display unit, the first function key being for entering the first BIOS setting mode, and the second function key being for entering the second BIOS setting mode.

As shown in FIG. 2b and in the step S12, the first BIOS setting mode is entered from the POST procedure, and the setting contents of the first BIOS setting mode comprise setting of the boot order program and/or the option ROM controller program.

Next, whether any setting contents of the first BIOS setting mode are revised and saved in the data processing unit is determined, so as to determine whether to continue executing the corresponding POST procedure based on the revised setting contents of the first BIOS setting mode or to skip the first BIOS setting mode and continue executing the following POST procedure.

Second Embodiment

Figure 3:
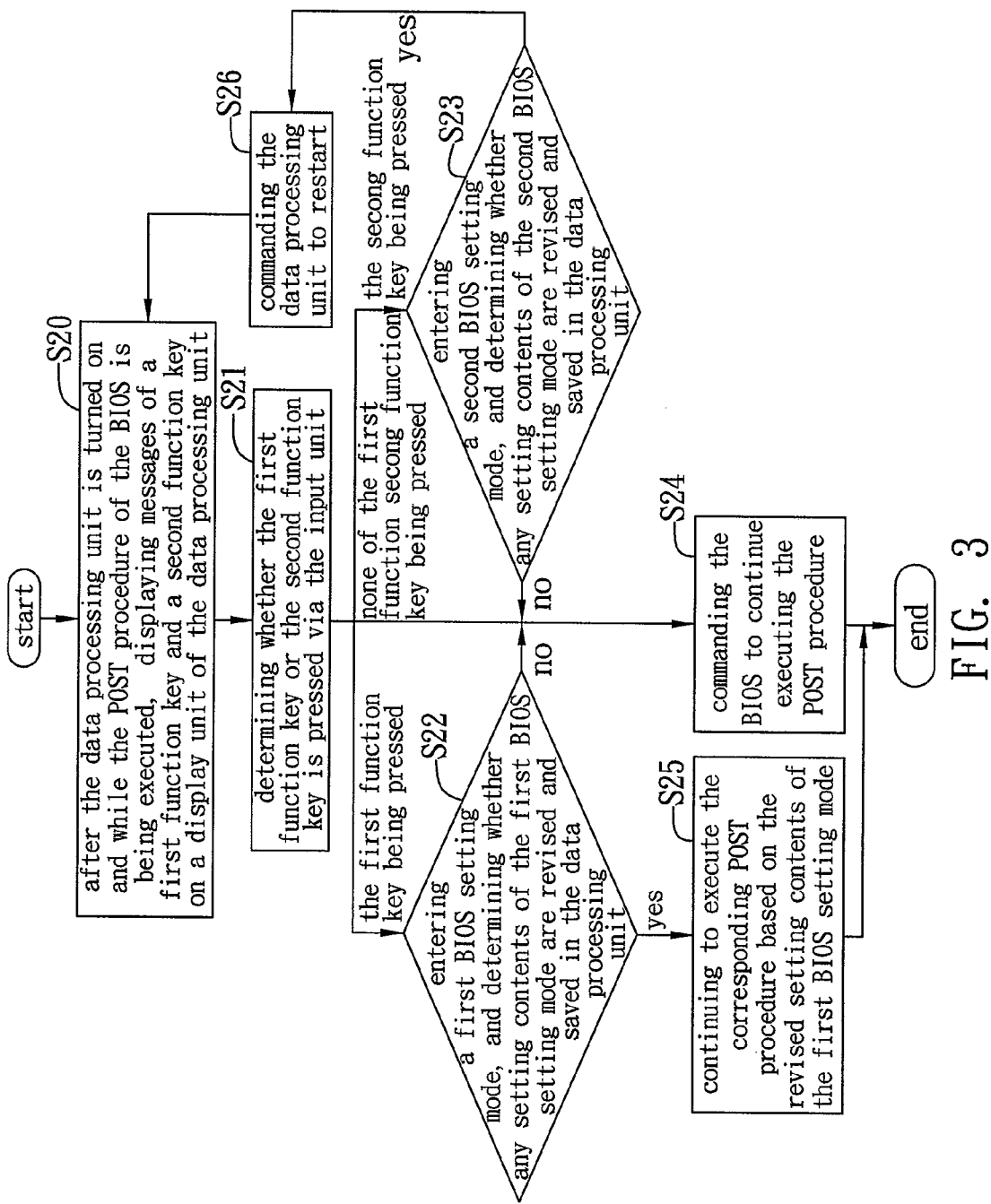
FIG. 3 is a flowchart of a BIOS setting method of a second embodiment according to the present invention.

Please refer to FIG. 3, which is a flowchart of a basic input output system setting method of a second embodiment according to the present invention. According to the second embodiment, the setting contents of the second BIOS setting mode do not include any setting contents of the first BIOS setting mode. In other words, the first BIOS setting mode and the second BIOS setting mode comprise different BIOS setting modes. More specifically, in step S23, whether any setting contents of the second BIOS setting mode are revised and saved in the data processing unit is determined. If yes, the second BIOS setting mode is skipped and the method proceeds to step S26; if no, the second BIOS setting mode is skipped and the method proceeds to step S24. In other words, the second embodiment does not have step S16 of the first embodiment.

The present invention provides a basic input output system setting method, by means of the foregoing setting and execution flow chart, the basic input output system setting method of the present invention is capable of distinguishing the BIOS setting mode whose revised setting will not affect the continuing POST procedure from the BIOS setting mode whose revised setting requires to restart the data processing unit, therefore, users do not have to restart the data processing unit after revising in the BIOS setting mode whose revised setting will not affect the continuing POST procedure, thus the basic input output system setting method of the present invention is capable of enhancing the efficiency of turn on procedure.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A basic input output system (BIOS) setting method, which is applicable to a BIOS setting procedure of a data processing unit having a display unit and an input unit, the BIOS setting method comprising the following steps of:
    (1) after the data processing unit is turned on and while a power on self test (POST) procedure of the BIOS is being executed, displaying messages of a first function key and a second function key on the display unit, the first function key being for entering a first BIOS setting mode, the second function key being for entering a second BIOS setting mode that includes setting contents of the first BIOS setting mode;
    (2) determining whether the first function key or the second function key is pressed via the input unit, and proceeding to step (3) if the first function key is pressed, to step (4) if the second function key is pressed, or continuing executing the POST if none of the first function key and the second function key is pressed;
    (3) entering the first BIOS setting mode from the POST procedure, and determining whether any setting contents of the first BIOS setting mode are revised and saved in the data processing unit and proceeding to step (5) if some of the setting contents of the first BIOS setting mode are revised and saved in the data processing unit or skipping the first BIOS setting mode and continuing executing the POST procedure if none of the setting contents of the first BIOS setting mode are revised or saved in the data processing unit; (4) entering the second BIOS setting mode from the POST procedure, and determining whether any setting contents of the second BIOS setting mode are revised and saved in the data processing unit and proceeding to step (6) if none of the setting contents of the second BIOS setting mode are revised or saved in the data processing unit or skipping the second BIOS setting mode and continuing executing the POST procedure if some of the setting contents of the second BIOS setting mode are revised and saved in the data processing unit;
    (5) continuing executing the corresponding POST procedure based on the revised setting contents of the first BIOS setting mode; and
    (6) commanding the data processing unit to restart, and returning to step (1).

2. The BIOS setting method of claim 1, wherein step (4) further includes a step of determining whether any setting contents of the second BIOS setting mode are revised and the revised setting contents are the same as the setting contents of the first BIOS setting mode and are saved in the data processing unit, and skipping the second BIOS setting mode and continuing executing the POST procedure if some of the setting contents of the second BIOS setting mode are revised and the revised setting contents are the same as the setting contents of the first BIOS setting mode and are saved in the data processing unit.

3. The BIOS setting method of claim 1, wherein the BIOS comprises at least an option ROM program, and in order to enter the first BIOS setting mode, the first function key has to be pressed before the option ROM program is executed.

4. The BIOS setting method of claim 3, wherein before the at least an option ROM program is executed, the BIOS further comprises at least one of a boot order program and a option ROM controller program, and the first BIOS setting mode is for setting the at least one of the boot order program and the option ROM controller program.

5. The BIOS setting method of claim 1, wherein the BIOS comprises at least an option ROM program, and in order to enter the first BIOS setting mode, the first function key has to be pressed before the option ROM program is executed.

6. The BIOS setting method of claim 5, wherein before the at least an option ROM program is executed, the BIOS further comprises at least one of a boot order program and a option ROM controller program, and the first BIOS setting mode is for setting the at least one of the boot order program and the option ROM controller program.

* * * * *